US012695626B2

(12) United States Patent
Groth et al.

(10) Patent No.: US 12,695,626 B2
(45) Date of Patent: Jul. 28, 2026

(54) DIGITAL SIGNATURES WITH RE-RANDOMIZED PRESIGNATURES

(71) Applicant: DFINITY STIFTUNG, Zürich (CH)

(72) Inventors: Jens Groth, Zürich (CH); Victor Shoup, New York City, NY (US)

(73) Assignee: DFINITY STIFTUNG, Zürich (CH)

( * ) Notice: Subject to any disclaimer, the term of this patent is extended or adjusted under 35 U.S.C. 154(b) by 46 days.

(21) Appl. No.: 18/697,308

(22) PCT Filed: Sep. 30, 2022

(86) PCT No.: PCT/EP2022/077318
§ 371 (c)(1),
(2) Date: Mar. 29, 2024

(87) PCT Pub. No.: WO2023/052603
PCT Pub. Date: Apr. 6, 2023

(65) Prior Publication Data

US 2024/0396743 A1 Nov. 28, 2024

Related U.S. Application Data

(60) Provisional application No. 63/250,711, filed on Sep. 30, 2021.

(51) Int. Cl.
*H04L 9/32* (2006.01)
*H04L 9/08* (2006.01)
*H04L 9/30* (2006.01)

(52) U.S. Cl.
CPC .......... *H04L 9/3255* (2013.01); *H04L 9/0869* (2013.01); *H04L 9/3066* (2013.01)

(58) Field of Classification Search
None
See application file for complete search history.

(56) References Cited

U.S. PATENT DOCUMENTS 6,295,359 B1 9/2001 Cordery et al.
2001/0009026 A1* 7/2001 Terao .................... H04L 9/3247 713/170
2010/0042842 A1 2/2010 Huang et al.
2016/0344557 A1 11/2016 Chabanne et al.
2017/0070348 A1* 3/2017 Tang ..................... H04L 9/3093
2018/0146035 A1 5/2018 Williams et al.
(Continued)

FOREIGN PATENT DOCUMENTS

CN 106251146 B 4/2018
WO 2021073953 A1 4/2021

OTHER PUBLICATIONS

David A Wagner, "A Generalized Birthday Problem", CRYPTO 2002, pp. 288-304.
(Continued)

*Primary Examiner* — William J. Goodchild
(74) *Attorney, Agent, or Firm* — Mannava & Kang, P.C

(57) ABSTRACT

Embodiments of the invention relate to a computer-implemented method for performing a digital signature. The embodied method comprises steps of computing a presignature, receiving a signing request to perform the digital signature on a message, re-randomizing the presignature and performing the digital signature on the message with the re-randomized presignature.

19 Claims, 5 Drawing Sheets

(56) References Cited

U.S. PATENT DOCUMENTS

| | | | | |
|---|---|---|---|---|
| 2019/0286614 | A1* | 9/2019 | Hornquist Astrand | H04L 9/0825 |
| 2023/0079431 | A1 | 3/2023 | Wu et al. | |

OTHER PUBLICATIONS

International Search Report for Application No. PCT/EP2022/077318, dated Jan. 18, 2023, 4 pages.
Ivan Gamgrd et al., "Fast Threshold ECDSA with Honest Majority", International Association For Cryptologic Research, vol. 20200504:183953, May 4, 2020, pp. 1-35.
Jean-Philippe Aumasson et al., "A Survey of ECDSA Threshold Signing", IACR Cryptol.ePrint Arch. 2020: 1390 (2020), 14 pages.
Paul Feldman, "A practical Scheme for non-interactive verifiable secret sharing", In 28th Annual Symposium on Foundations of Computer Science, pp. 427-437, Los Angeles, California, Oct. 12-14, 1987. IEEE Computer Society Press.
Ran Canetti et al., "US Non-Interactive, Proactive, Threshold ECDSA with Identifiable Aborts", International Association for Cryptologic Research (IACR), vol. 20210118:082423, Jan. 15, 2021, pp. 1-74.
Rosario Gennaro et al., "Secure distributed key generation for discrete-log based cryptosystems", In Jacques Stern, editor, Advances in Cryptology—Eurocrypt'99, vol. 1592 of Lecture Notes inComputer Science, pp. 295-310, Prague, Czech Republic, May 2-6, 1999. Springer, Heidelberg, Germany.
S. Josefsson et al., "Edwards-Curve Digital Signature Algorithm (EdDSA)", Internet Research Task Force (IRTF), Request for Comments: 8032, ISSN: 2070-1721, Jan. 2017, 60 pages.
Timo Hanke et al., "DFINITY Technology Overview Series Consensus System", May 11, 2018, 16 pages.
Torben P. Pedersen, "A threshold cryptosystem without a trusted party (extended abstract) (rump session)", In Donald W. Davies, editor, Advances in Cryptology—Eurocrypt'91, vol. 547 of Lecture Notes in Computer Science, pp. 522-526, Brighton, UK, Apr. 8-11, 1991. Springer, Heidelberg, Germany.
Victor Shoup, "Lower Bounds for Discrete Logarithms and Related Problems", Eurocrypt 1997, 12 pages.
Singaporean Search Report and Written Opinion for Application No. 11202402085R, mailed Feb. 5, 2026, 9 pages.

* cited by examiner

DIGITAL SIGNATURES WITH RE-RANDOMIZED PRESIGNATURES

CLAIM FOR PRIORITY

The present application is a national stage filing under 35 U.S.C 371 of PCT application number PCT/EP2022/077318, having an international filing date of Sep. 30, 2022, which claims priority to U.S. patent application No. 63/250,711 having a filing date of Sep. 30, 2021, the disclosures of which are hereby incorporated by reference in their entireties.

TECHNICAL FIELD

The present invention relates to a computer-implemented method for performing a digital signature according to a public key signature scheme.

Further aspects relate to a corresponding computing system and a corresponding computer program product.

BACKGROUND ART

Digital signatures are used for signing digital messages and involve asymmetric cryptography. The digital signatures may be used for verifying the authenticity of digital messages or documents.

The Elliptic Curve Digital Signature Algorithm (ECDSA) is a variant of the Digital Signature Algorithm (DSA) based on elliptic curve cryptography. Compared with DSA, ECDSA provides the advantage that the public keys and the digital signatures may be shorter to achieve the same level of security.

As some of the values which are to be computed in the signing algorithm of ECDSA are independent of the message to be signed, they may be precomputed in advance in order to simplify and accelerate the actual signing of a message. The pre-computation of such values may be denoted as pre-signing and the computed values may be denoted as presignatures.

However, such presignatures may introduce potential security weaknesses.

DISCLOSURE OF THE INVENTION

Accordingly, one object of an aspect of the invention is to provide a computer-implemented method for performing a digital signature which provides enhanced security, in particular in combination with the computation of presignatures.

According to an embodiment of a first aspect of the invention there is provided a computer-implemented method for performing a digital signature. The embodied method comprises steps of computing a presignature, receiving a signing request to perform the digital signature on a message, re-randomizing the presignature and performing the digital signature on the message with the re-randomized presignature.

Such a re-randomization of the presignature offers enhanced security over plain presignatures. In particular, it may foil a 4-sum attack. Furthermore, such a re-randomization hardly adds any additional costs in terms of latency and computation.

According to embodiments, the presignature comprises a random element/random part and re-randomizing the presignature comprises re-randomizing the secret random element/random part. The random element/random part may be in particular a secret random element/random part.

According to an embodiment, computing the presignature comprises computing a random nonce. Such a random nonce establishes a random part of the presignature. According to such an embodiment re-randomizing the presignature comprises re-randomizing the nonce.

According to an embodiment, re-randomizing the presignature comprises performing an algebraic operation on the presignature. According to embodiments the algebraic operation may be a linear operation. Such algebraic operations, in particular linear operations, can be implemented in an efficient manner, in particular for threshold signatures.

According to embodiments, the digital signature may be a threshold signature. Such a threshold signature may be in particular used in distributed settings involving a plurality of signing parties.

Pre-signatures are particularly advantageous in such a distributed setting. In particular, as the presignature involves the computing of some secret random value such as the nonce, the computation and sharing of such a secret value involves significant costs in terms of communication overhead between the involved parties. Hence by pre-computing the random value in advance, the actual signing may be accelerated significantly.

According to embodiments, re-randomizing the presignature comprises computing a non-predictable public re-randomization value and utilizing the public re-randomization value for the re-randomizing of the presignature.

In this respect non-predictable shall be understood as not predictable before a signing request has been determined and/or received. Determination may take place before a signing respect has been received by a respective signing entity.

According to such an embodiment, the re-randomizing utilizes a public re-randomization value for re-randomizing the presignature, e.g. as a coefficient in the algebraic operation.

A public re-randomization value shall be understood as a value that does not need to be kept secret. In particular, according to embodiments it may be assumed that the public re-randomization value is given to an adversary as an output of the signing request.

According to such a scheme the re-randomization is public. This provides particular advantages for threshold signatures. More particularly, the involved costs for performing the re-randomization, in particular in terms of computational and communication overhead, are significantly lower compared with a secret randomization.

According to an embodiment, the non-predictable public re-randomization value is generated after receiving the signing request.

According to an embodiment, the method further comprises performing a pseudo-random generation of the public re-randomization value.

According to an embodiment, the method further comprises deriving the public re-randomization value from a random beacon.

Such a random beacon may be generally defined as any publicly available randomness, in particular randomness that is provided by the computing system or distributed network on which the method is performed. According to embodiments, such a random beacon may be implemented using a threshold BLS signature scheme as described e.g. in US 2018/146035 A1.

According to an embodiment, the method further comprises deriving the public re-randomization value by applying a hash function to at least the message or a hash of the message.

According to an embodiment, the hash function may be optionally also applied to the public key of the digital signature and/or to other inputs such as a random beacon.

According to an embodiment, the digital signature is a digital signature according to a signature algorithm based on discrete logarithms. According to an embodiment, the digital signature is a digital signature according to a signature algorithm based on elliptic curves. According to an embodiment, the digital signature is a digital signature according to the Elliptic Curve Digital Signature Algorithm (ECDSA).

According to an embodiment, the method comprises providing a master secret key pair, the master secret key pair comprising a first master secret key and a second master secret key, and providing a master public key pair, the master public key pair comprising a first master public key and a second master public key. The method comprises further steps of deriving a secret subkey from the master secret key pair and deriving a public subkey from the master public key pair.

Such a key derivation from a master public key pair and a corresponding master secret key pair may be performed on the one hand in an efficient way at rather little computational and communication costs, in particular for threshold signatures.

On the other hand, such a derivation scheme provides security levels which are essentially equivalent to a corresponding scheme without such a key derivation.

Such an embodied method allows to derive several distinct public subkeys/secret subkeys from the master key pair while only having to store a single master secret key pair.

According to an embodiment, deriving the secret subkey from the master secret key pair comprises performing a first algebraic operation on the master secret key pair and deriving the public subkey from the master public key pair comprises performing a second algebraic operation on the master secret key pair.

According to embodiments, the first algebraic operation and the second algebraic operation may be the same.

According to embodiments, deriving the secret subkey from the master secret key pair may comprise performing the key derivation such that the secret subkey depends on both the first master secret key and the second master secret key and the public subkey depends on both the first master public key and the second master public key.

Such a key derivation technique may be denoted as mixed key derivation.

According to embodiments, the first algebraic operation and the second algebraic operation are linear operations.

According to an embodiment, the digital signature algorithm operates on an elliptic curve E defined over $\mathbb{Z}$ p and generated by a point G of order q, in particular prime order q. Assuming that D is the first master public key, D' is the second master public key, d is the first master secret key and d' is the second master secret key, the first master public key and the second master public key may then be derived from the first master secret key and the second master secret key as follows:

$$(D, D') := (dG, d'G).$$

From these master key pairs the secret subkeys and the public subkeys may then be computed as follows. The secret subkey d" may be computed from the master secret key pair by computing $$d'' := d + ed'.$$

Furthermore, the public subkey D" may be computed from the master public key pair by computing $$D'' := D + eD'.$$

According to embodiments, e may be a discriminant ∈ $\mathbb{Z}$ q, wherein $\mathbb{Z}$ q is the set of integers 0-, . . . , q−1 with the arithmetic performed mod q.

A discriminant according to embodiments of the invention may be generally defined as an agent or characteristic that enables things, people, or classes to be distinguished from one another. Correspondingly, in the context of embodiments of the invention the discriminant enables to derive the secret subkey and the public subkey from the master secret key pair and the master public key pair respectively.

According to an embodiment, the discriminant may be derived by a hash function. The hash function may be embodied as collision resistant.

According to an embodiment the discriminant may be derived by applying the hash function on a set of hash input data. The hash input data may comprise an arbitrary identifier, the master public key pair and/or further input data.

According to embodiments, the arbitrary identifier uniquely identifies ownership and/or context of the public subkey or the secret subkey.

According to embodiments, also an additive key generation may be combined with a re-randomization of presignatures.

According to an embodiment of another aspect, a computing system for performing a digital signature according to a public key signature scheme is provided which is configured to perform steps of the method aspects of the invention.

According to an embodiment of another aspect of the invention, a computer program product for performing a digital signature according to a public key signature scheme is provided. The computer program product comprises a computer readable storage medium having program instructions embodied therewith, the program instructions executable by the computing system to cause the computing system to perform steps of the method aspect of the invention.

Features and advantages of one aspect of the invention may be applied to the other aspects of the invention as appropriate. The steps of the method aspects of the invention may be performed in different orders according to embodiments.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
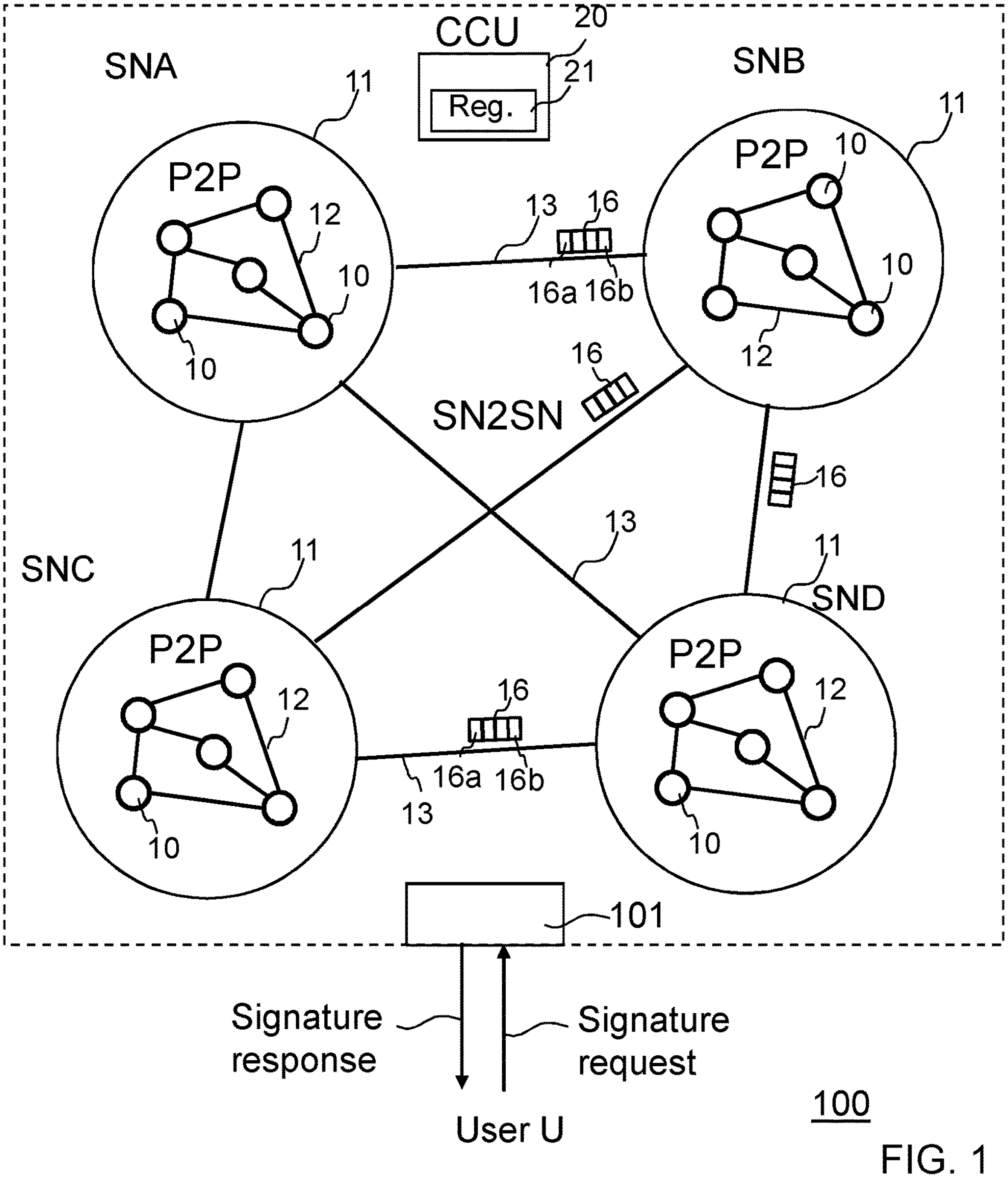
FIG. 1 shows an exemplary diagram of distributed network according to an embodiment of the invention.

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A verification key/public key: a bit-string of a public key signature scheme intended to be widely publicized. A verification key may also be denoted as public key and may be used e.g. for the verification of digital signatures of the public key signature scheme.

A public-key signature scheme according to embodiments of the invention may comprise e.g. keys of a public-key signature and encryption scheme such as RSA or keys of a public-key signature scheme such as Schnorr or DSA.

Secret key (sk): a bit-string related to a public key, in particular a verification key, enabling some cryptographic operation, in particular digitally signing a message. A secret key may also be denoted as private key.

Distributed key generation (DKG): a protocol enabling a set of dealers to create a public key, in particular a verification key, and provide a set of receivers with a secret key share of the corresponding secret key.

(n,t)-threshold key/threshold secret key: Such a threshold key has a threshold t and a number of secret key shares s1, . . . , sn such that any t secret key shares enable reconstruction of the secret key, while t−1 shares do not suffice to determine the secret key. In case of a threshold public key signature scheme, any t secret key shares enable the execution of a valid signature under the threshold public key/verification key, while t−1 shares do not suffice to execute a valid signature.

According to embodiments, the Feldman protocol [Fel87], joint Feldman protocol [Ped91] and the GJKR protocol [GJKR99] may be used as distributed key generation protocols. These protocols are e.g. published as follows and their corresponding disclosure is herewith incorporated by reference:

[Fel87] Paul Feldman. A practical scheme for non-interactive verifiable secret sharing.

In 28th Annual Symposium on Foundations of Computer Science, pages 427-437, Los Angeles, California, Oct. 12-14, 1987. IEEE Computer Society Press.

[Ped91] Torben P. Pedersen. A threshold cryptosystem without a trusted party (extended abstract) (rump session). In Donald W. Davies, editor, Advances in Cryptology—EUROCRYPT' 91, volume 547 of Lecture Notes in Computer Science, pages 522-526, Brighton, UK, Apr. 8-11, 1991. Springer, Heidelberg, Germany.

[GJKR99] Rosario Gennaro, Stanislaw Jarecki, Hugo Krawczyk, and Tal Rabin. Secure distributed key generation for discrete-log based cryptosystems. In Jacques Stern, editor, Advances in Cryptology—EUROCRYPT' 99, volume 1592 of Lecture Notes in Computer Science, pages 295-310, Prague, Czech Republic, May 2-6, 1999. Springer, Heidelberg, Germany.

Elliptic Curve Digital Signature Algorithm (ECDSA):

The ECDSA is a variant of the Digital Signature Algorithm (DSA) and uses elliptic curve cryptography. More particularly, ECDSA signatures operate over an elliptic curve or a subgroup of an elliptic curve.

Threshold Elliptic Curve Digital Signature Algorithm:

A threshold signature algorithm based on elliptic curve cryptography, wherein any t secret key shares enable the execution of a valid ECDSA signature under the threshold ECDSA-public key/verification key, while t−1 shares do not suffice to execute a valid ECDSA-signature.

Such a threshold Elliptic Curve Digital Signature Algorithm (ECDSA) is e.g. described in the document by Jean-Philippe Aumasson, Adrian Hamelink, Omer Shlomovits: A Survey of ECDSA Threshold Signing. IACR Cryptol. ePrint Arch. 2020: 1390 (2020).

Secure multi-party computation: Secure multi-party computation refers generally to methods according to which multiple parties jointly compute a function over input data provided by the multiple parties, wherein the multiple parties keep their respective input data secret/secret. Secure multi-party computation may also be denoted just as multi-party computation (MPC) or privacy-preserving computation.

Signature algorithms based on elliptic curves shall include the Elliptic Curve Digital Signature Algorithm (ECDSA), but also several other signature algorithms which use elliptic curves, such as The Edwards-curve Digital Signature Algorithm (EdDSA) which is a signature algorithm using a variant of Schnorr signature based on twisted Edwards curves as specified in the document RFC 8032, Internet Research Task Force (IRTF), Request for Comments: 8032, ISSN: 2070-1721 January 2017.

According to embodiments, the term multi-party computation may refer in particular to methods according to which multiple parties, e.g. n parties p1, p2, . . . , pN, each have secret/secret data, e.g. s1, s2, . . . , SN respectively. Furthermore, the multiple parties want to compute the value of a public function F on that secret/secret data: F(s1, s2, . . . , sN) while keeping their own input data secret/secret, i.e., do secure function evaluation.

According to embodiments, multi-party computation may make use in particular of (n,t)-threshold keys/threshold secret keys as secret/secret data.

According to embodiments, multi-party computation may comprise in particular the computation of threshold signatures.

A presignature may be defined as any value/intermediate value used in computing a signature which may be computed before a respective message that shall be signed has been received. A presignature may be in particular unrelated to the message, in particular to the content of the message to be signed.

A presignature may comprise in particular a random value such as a nonce.

Re-randomizing a presignature shall be understood in particular as adding additional randomness, e.g. additional random values, to the presignature.

A 4-sum attack is an attack that has been described e.g. by David A Wagner in "*A Generalized Birthday Problem.", CRYPTO* (2002).

A "raw" signing oracle is a signing oracle that takes as input the purported hash h rather than the message m.

An offline phase of methods for performing a digital signature, in particular a threshold signature, according to embodiments encompasses the steps of the method where the message to be signed is not yet required. The offline phase may also be denoted as pre-processing phase. The offline phase may be in particular used for computing presignatures. The computations of the offline phase may be performed in advance and the results such as the presignatures may be stored for later use.

An online phase of methods for performing a digital signature, in particular a threshold signature, according to embodiments encompasses the steps of the method for which the message to be signed is required. The online phase starts when a signature is requested and the message to be signed is hence available. Rather than performing the signing protocol in full, the parties may then use the stored presignature and the actual signing is then much more efficient. A re-randomization of the signature is also performed during the online phase according to embodiments.

A generic group model is an idealised cryptographic model as introduced in the paper "Lower Bounds for Discrete Logarithms and Related Problems", Victor Shoup, EUROCRYPT 1997. According to the generic group model an adversary is only given access to a randomly chosen encoding of a group, instead of concrete encodings, such as those used by the finite field or elliptic curve groups used in practice.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are assigned to a plurality of replicated computing clusters 11. The replicated computing clusters 11 establish and may be in the following denoted as subnetworks 11. In the example of FIG. 1, four subnetworks 11 denoted with SNA, SNB, SNC and SND are provided.

Each of the plurality of subnetworks 11 is configured to run a set of computational units on each node 10 of the respective subnetwork 11. According to embodiments, a computational unit shall be understood as a piece of software, in particular as a piece of software that comprises or has its own unit state or in other words execution state.

According to embodiments, a unit state shall be understood as all the deterministic data or information that is used by the deterministic subunits of the computational units, in particular the data that the computational units store in variables, but also data the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

The network 100 comprises communication links 12 for intra-subnetwork communication within the respective subnetwork 11, in particular for intra-subnetwork unit-to-unit messages to be exchanged between computational units assigned to the same subnetwork.

Furthermore, the network 100 comprises communication links 13 for inter-subnetwork communication between different ones of the subnetworks 11, in particular for inter-subnetwork unit-to-unit messages to be exchanged between computational units assigned to different subnetworks.

Accordingly, the communication links 12 may also be denoted as intra-subnetwork or Peer-to-Peer (P2P) communication links and the communication links 13 may also be denoted as inter-subnetwork or Subnetwork-to-Subnetwork (SN2SN) communications links.

According to embodiments of the invention the subnetworks 11 are configured to replicate the set of computational units across the respective subnetwork 11. More particularly, the subnetworks 11 are configured to replicate the unit state of the computational units across the respective subnetwork 11.

The network 100 may in particular be a proof-of-stake blockchain network.

The network 100 is configured to exchange inter-subnetwork messages 16 between the subnetworks SNA, SNB, SNC and SND via a messaging protocol and a consensus protocol. The consensus protocol is configured to reach a consensus on the processing order of the inter-subnetwork messages 16 at the respective receiving subnetwork.

According to embodiments, the network 100 may be configured to run the consensus protocol separately on each subnetwork. In other words, each of the subnetworks SNA, SNB, SNC and SND runs its own consensus protocol separately and independently from the other subnetworks.

The distributed network 100 may comprise a central control unit CCU, 20. The central control unit 20 may comprise a central registry 21 to provide network control information to the nodes of the network.

According to embodiments, at least one of the subnetworks SNA, SNB, SNC or SND is embodied as a replicated system computing cluster. Each of the nodes of such a replicated system computing cluster comprises a system computational unit. Such a system computing cluster may perform multi-party computations such as threshold signatures.

The distributed network 100 may provide a user interface 101 to users of the distributed network 100.

The user may send a signature request for signing e.g. a message m by means of a digital signature. The digital signature may be in particular a threshold signature, e.g. a threshold ECDSA-signature. The signature request may be performed by means of a system call. The distributed network 100 may execute the requested signature by the system computational units of the replicated system computing cluster and may provide a signature response comprising the message m with the executed signature via the user interface 101.

Figure 2:
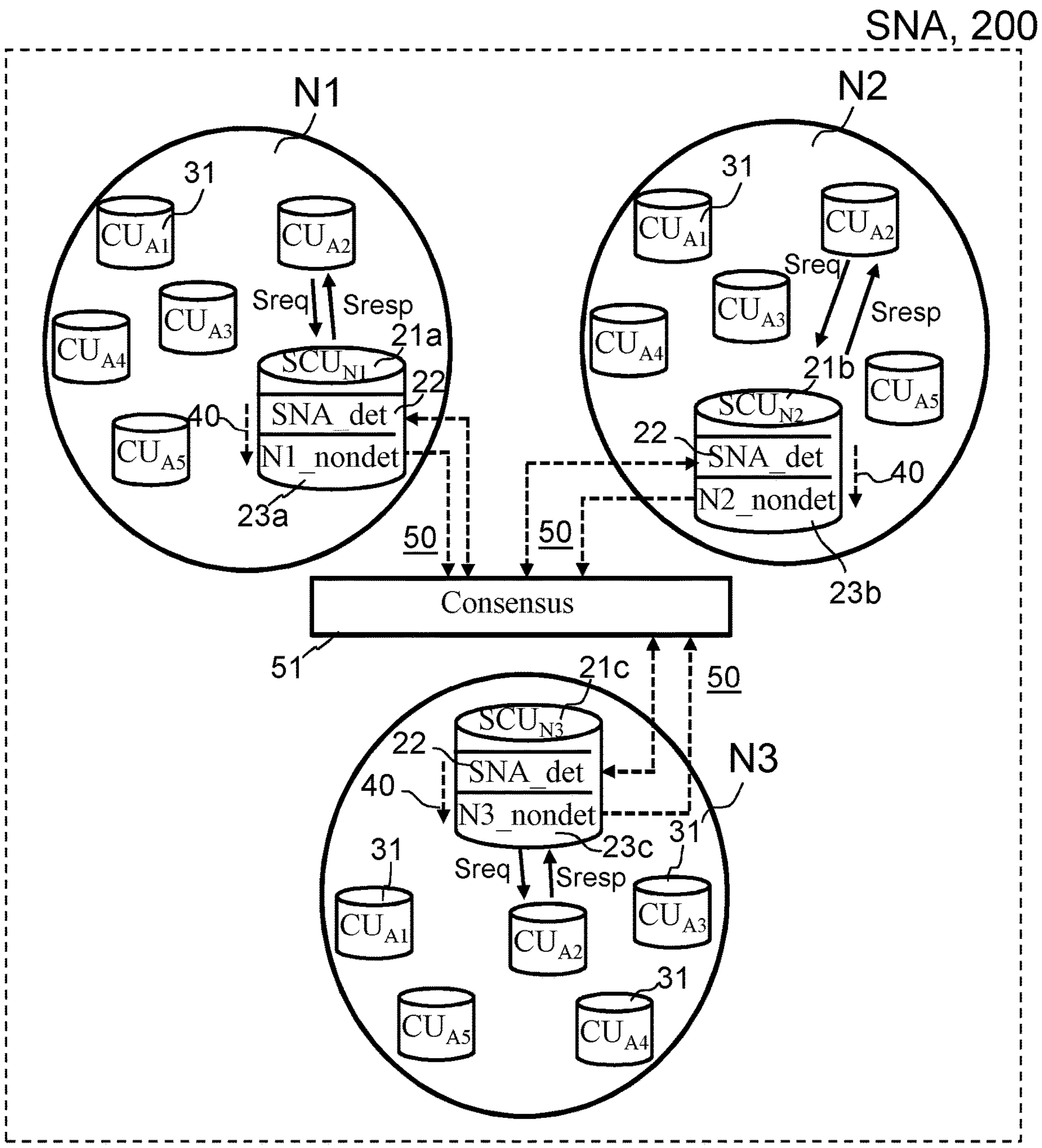
FIG. 2 illustrates an exemplary replicated system computing cluster.

FIG. 2 illustrates in a more detailed way an exemplary replicated computing cluster/subnetwork SNA, 200 comprising a plurality of nodes N1, N2 and N3. The replicated computing cluster 200 is embodied as a system computing cluster. Each of the plurality of nodes N1, N2 and N3 of the replicated system computing cluster 200 is configured to run a system computational unit. More particularly, the system computational units encompass a system computational unit 21*a*, $SCU_{N1}$ running on the node N1, a system computational unit 21*b*, $SCU_{N2}$ running on the node N2 and a system computational unit 21*c*, $SCU_{N3}$ running on the node N3. The system computational units 21*a*, 21*b* and 21*c* may be commonly referred to as system computational units 21. The system computational units 21*a*, 21*b* and 21*c* of the replicated system computing cluster 200 comprise deterministic subunits 22, SNA det configured to perform a deterministic and replicated computation across the replicated system computing cluster 200, SNA and traverse thereby the same chain of unit states. The system computational units 21*a*, 21*b* and 21*c* of the replicated system computing cluster 200 comprise furthermore non-deterministic subunits for performing non-deterministic computations. More particularly, the system computational unit 21*a*, $SCU_{N1}$ comprises a non-deterministic subunit 23*a*, N1_nondet. The non-deterministic subunit 23*a* may store and compute non-deterministic data which is specific/individual to the node N1. Likewise, the system computational unit 21*b*, $SCU_{N2}$ comprises a non-deterministic subunit 23*b*, N2_nondet which may store and compute non-deterministic data which is specific/individual to the node N2. And the system computational unit 21*a*, $SCU_{N3}$ comprises a non-deterministic subunit 23*c*, N3_nondet which may store and compute non-deterministic data which is specific/individual to the node N3. In addition, each of the nodes N1, N2 and N3 is configured to run one or more application computational units for providing application services to users of the distributed network. More particularly, each of the nodes N1, N2 and N3 is configured to run a set of five application computational units 31, more particularly the application computational units $CU_{A1}$, $CU_{A2}$, $CU_{A3}$, $CU_{A4}$ and $CU_{A5}$. These application computational units $CU_{A1}$, $CU_{A2}$, $CU_{A3}$, $CU_{A4}$ and $CU_{A5}$ are also configured to perform a deterministic and replicated computation across the system computing cluster 200. As the system computing cluster 200 comprises both application computational units and system computational units, it may be denoted as a mixed computing cluster.

Each of the system computational units 21*a*, 21*b* and 21*c* has a unidirectional communication mechanism 40 from the deterministic subunits 22 to the respective non-deterministic subunits 23*a*, 23*b* and 23*c*.

In addition, each of the system computational units 21*a*, 21*b* and 21*c* may establish a unidirectional communication mechanism 50 from the non-deterministic subunits 23*a*, 23*b* and 23*c* to the deterministic subunits 22. The communication mechanism 50 comprises a consensus mechanism 51. The consensus mechanism 51 may be used to reach a consensus on the messages provided to each of the deterministic subunits 22 such that the deterministic subunits 22 all have the same view/state of the non-deterministic data provided by one of the respective non-deterministic subunits 23*a*, 23*b* or 23*c*.

According to embodiments each of the application computational units $CU_{A1}$, $CU_{A2}$, $CU_{A3}$, $CU_{A4}$ or $CU_{A5}$ may invoke a system call to the system computational units 21*a*, 21*b* and 21*c* for performing a multi-party computation. The system call may be in particular a signature request for performing a signature on e.g. a message m provided by the respective application computational unit. In FIG. 2 there is illustrated a signature request Sreq which is issued by the application computational unit $CU_{A2}$. As a result of the multi-party computation performed by the system computational units 21*a*, 21*b* and 21*c*, the application computational unit $CU_{A2}$ receives a signature response Sresp.

Figure 3:
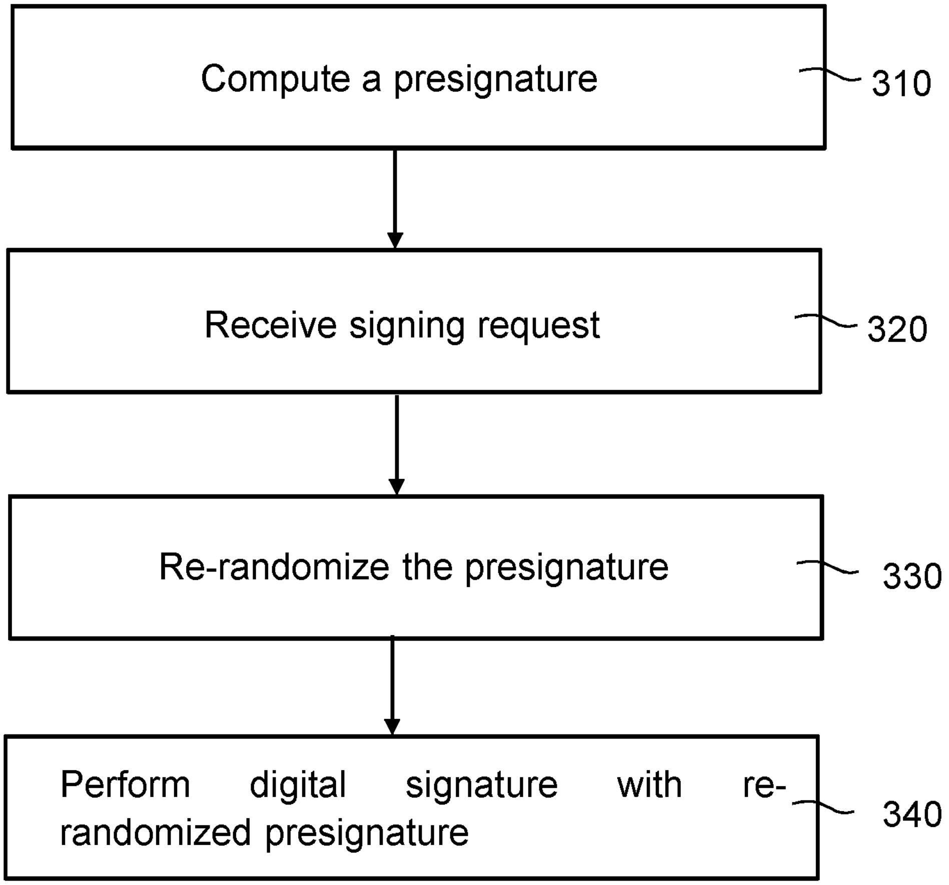
FIG. 3 shows a schematic flow chart of a computer-implemented method according to an embodiment of the invention.

FIG. 3 shows a flow chart of methods steps of a computer-implemented method for performing a digital signature according to a public key signature scheme.

At a step 310, a signing entity computes a presignature.

At a step 320, the signing entity receives a signing request to perform the digital signature on a message.

At a step 330, the signing entity re-randomizes the signature.

At a step 340, the signing entity performs the digital signature on the message with the re-randomized presignature.

In the following it is assumed that the method is embodied as a digital signature according to an elliptic curve digital signature algorithm (ECDSA) and the above mentioned steps will be explained in more detail with reference to ECDSA.

ECDSA may be based on a signature scheme as follows: Let E be an elliptic curve defined over $Z_p$ and generated by a point G of prime order q. The unreduced conversion function $C:E^* \rightarrow Z_p$ maps a point P to its x-coordinate. The reduced conversion function $C^-:E^* \rightarrow Z_q$ maps a point P to the canonical representative of C(P) (i.e., an integer in the range [0,p)) reduced mod q.

The secret key for ECDSA is a random $$d \in Z_q^*,$$

the public key is D=dG∈E. The signature scheme according to ECDSA makes use of a hash function Hash: $\{0,1\}^* \rightarrow \mathbb{Z}$ q. To sign a message m, the signature scheme may proceed as follows:

$h \leftarrow Hash(m) \in \mathbb{Z}_q$ $r \xleftarrow{\$} \mathbb{Z}_q^*$ $\mathcal{R} \leftarrow r\mathcal{G} \in E$ $t \leftarrow \overline{C}(\mathcal{R}) \in \mathbb{Z}_q$ if t = 0 or h + td = 0 then return fail $s \leftarrow r^{-1}(h + td)$ return the signature (s, t)

To verify a signature $$(s, t) \in Z_q^* \times Z_q^*$$

on a message m, a verifier may proceed as follows:

$h \leftarrow Hash(m) \in \mathbb{Z}_q$ $\mathcal{R} \leftarrow s^{-1}h\mathcal{G} + s^{-1}t\mathcal{D}$ check that $\mathcal{R} \neq \mathcal{O}$ and $\overline{C}(\mathcal{R}) = t$ In the ECDSA signing algorithm, the values r and R:=rG are independent of the message to be signed. Hence they can be precomputed in advance of an actual signing request. Such elements of a signing algorithm that can and actually are precomputed in advance establish a presignature according to embodiments of the invention. The value r establishes a random nonce or in other words forms a random value of the presignature.

While according to some embodiments only the value r may be precomputed, in other embodiments both r and R may be precomputed. The latter embodiments is in particular advantageous in distributed settings involving threshold signatures, in particular ECDSA threshold signatures. In the threshold setting each party may precompute a sharing of r. Furthermore, also R itself may be precomputed. Such an embodiment may significantly simplify the online signing phase of the protocol.

According to embodiments, the presignature including the nonce may be re-randomized. Referring to the ECDSA embodiment as described above, a presignature of the form $r' \in Z_q$ and $R' := r'G \in E$ may be computed as before.

However, when a signing request is made, the original presignature is re-randomized by means of a non-predictable public re-randomization value δ. According to the above ECDSA embodiment, the actual presignature used may be $$r := r' + \delta \text{ and } R := R' + \delta G,$$

where δ is a public value, wherein in particular $\delta \in Z_q$. The re-randomization value δ and hence the presignatures are not predictable before the signing request with the message has been received or determined.

With such a re-randomization, stronger security levels may be proven. Specifically, a security level may be proven for re-randomized presignatures without additive key derivation that is essentially equivalent to the security level for plain ECDSA. Furthermore, it is still secure if an adversary can obtain signatures directly on message digests rather than on messages (raw signing). With additive key derivation, the concrete security degrades by a factor of $|E|$, where E is the set of valid discriminants/tweaks, but the resulting scheme is no longer vulnerable to a 4-sum attack. Both with and without additive key derivation, security may be proven with respect to a raw signing.

As mentioned, the use of re-randomized presignatures is in particular advantageous in the threshold setting. As according to embodiments the re-randomization is an algebraic operation, in particular a linear, operation, the costs of the re-randomization in terms of working with shares is moderate/negligible.

However, there is a cost associated with actually generating the non-predictable public re-randomization value δ itself. That cost may be depend on other aspects of the computing system in which the digital signature will be executed.

According to an embodiment, the non-predictable public re-randomization value δ may be generated after receiving the signing request, by performing a pseudo-random generation of the public re-randomization value δ, e.g. by means of a pseudo-random number generator.

According to an embodiment, the public re-randomization value δ may be computed by applying a hash function to at least the message or a hash of the message. According to embodiments, the hash function may be applied on further inputs such as the public key of the digital signature. In case of additive key derivation, the hash may also be applied to the discriminant.

Such an embodiment for re-randomizing presignatures comes at essentially no cost, either in terms of computation or latency. Nevertheless it heuristically appears to offer more security than plain presignatures, and in particular foils a 4-sum attack.

According to further embodiments, the public re-randomization value δ may be derived from a random beacon. Such a random beacon may be generally defined as any publicly available randomness. According to embodiments, such a random beacon may be implemented using a threshold BLS-signature scheme.

Figure 4:
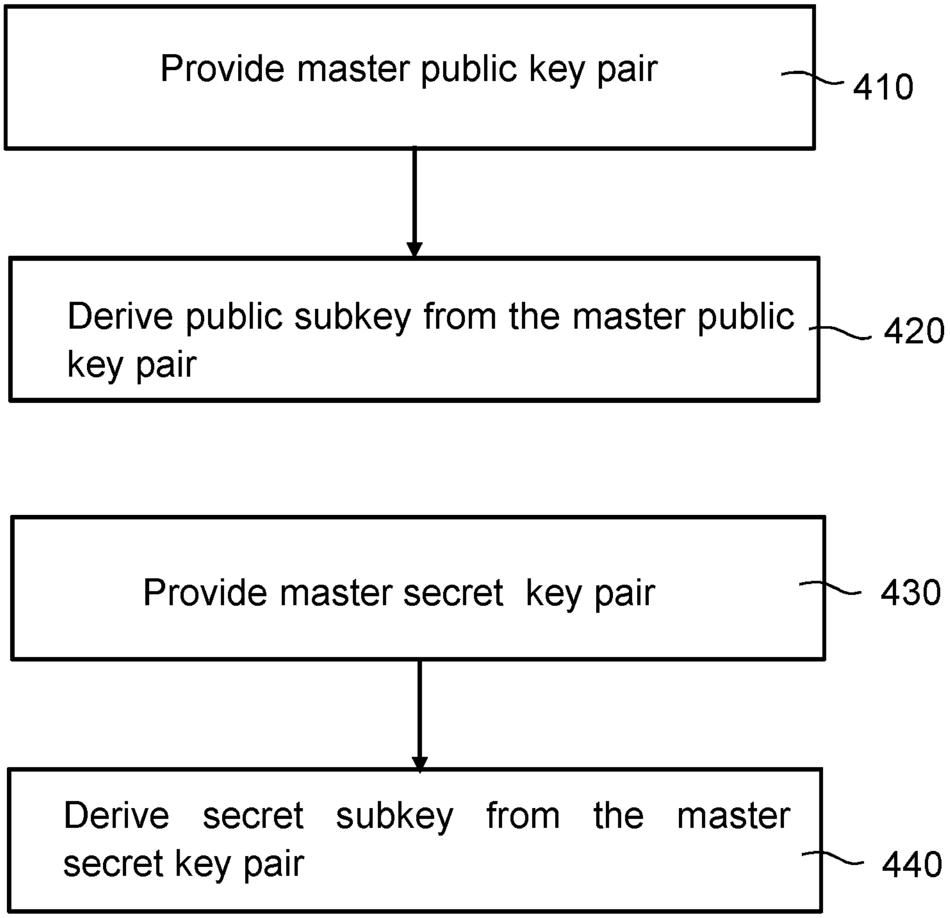
FIG. 4 shows a schematic flow chart of a computer-implemented method according to an embodiment of the invention.

FIG. 4 shows another flow chart of methods steps of a computer-implemented method for performing a digital signature according to a public key signature scheme.

At a step 410, the signing entity provides, holds, stores and/or uses a master public key pair, the master public key pair comprising a first master public key and a second master public key.

At a step 420, the signing entity derives a public subkey from the master public key pair.

At a step 430, a signing entity provides, holds stores and/or uses a master secret key pair. The master secret key pair comprises a first master secret key and a second master secret key.

At a step 440, the signing entity derives a secret subkey from the master secret key pair.

The steps 410 and 430 may be considered as preparation steps and may be also considered as a common step. The master public/secret key pair may be randomly chosen.

Such a derivation of subkeys from a master key pair has in general the advantage that it reduces the costs of storing secret keys. More particularly, it allows to derive several distinct public subkeys to be used while only having to store a single secret key pair.

This secret-key storage cost manifests itself in both the threshold and non-threshold settings. In the non-threshold setting, there is the cost of maintaining the secret key in some kind of secure storage. In the threshold setting, there is the cost of storing secret shares in some kind of secure storage, as well as the cost of actively refreshing these shares periodically if proactive security is to be maintained. Nevertheless, such a scheme may be efficiently implemented as a threshold signature scheme.

In the following, the key-derivation technique according to embodiments of the invention will be explained in an exemplary way with respect to ECDSA-signatures.

According to such an embodiment, the master secret key is now a random master secret key pair $(d, d') \in Z_q \times Z_q$, and the corresponding master public key is the master public key pair $$(D, D') := (dG, d'G) \in E \times E.$$

For a given discriminant, which may also be denoted as "tweak" $e \in Z_q$, the corresponding derived secret subkey d" is $d+ed' \in Z_q$ and the corresponding derived public subkey D" is D+eD'.

Hence the step of deriving the secret subkey from the master secret key pair comprises performing a first algebraic operation on the master secret key pair, which is in the above example a linear operation and deriving the public subkey from the master public key pair comprises performing a second algebraic operation on the master secret key pair, which is in the above example a linear operation. Furthermore, in the above example both algebraic/linear operations are the same.

The discriminant/tweak e may be generally defined according to an embodiment as an agent or characteristic that enables things, people, or classes to be distinguished from one another. The discriminant e may be derived in particular by a hash function, in particular a collision resistant hash function.

By using a master key pair comprising master secret key pairs and master public key pairs, stronger security levels may be proven than with additive key derivation.

In particular, according to embodiments it does not need to be assumed that the discriminants/tweaks come from some predetermined set $E \subseteq Z_q$. As such, it may be assumed that a discriminant/tweak $e \in Z_q$ may be derived from the hash function Hash as $$e \leftarrow \mathrm{Hash}(id),$$

wherein id is an arbitrary identifier.

The arbitrary identifier id may uniquely identify ownership and/or context of the public subkey or the secret subkey.

According to embodiments, the discriminant e may be derived by applying the hash function Hash on a set of hash input data. According to such an embodiment, the hash input data may comprise the arbitrary identifier id, the master public key pair and/or further input data.

According to embodiments, Hash may be the same hash function as used before to generate h in the ECDSA signing algorithm. According to other embodiments, a different hash function may be applied. According to embodiments, the only requirement is that this hash function maps into $Z_q$ and is collision resistant.

According to embodiments, the signing algorithm may take as input both a message m and the arbitrary identifier id.

Such a key derivation technique as presented above may be combined with re-randomized presignatures according to embodiments.

According to another embodiment, an additive key derivation technique may be combined with re-randomized presignatures according to embodiments.

Such an additive key derivation technique will be described in the following in more detail with reference to FIG. 7.

Figure 7:
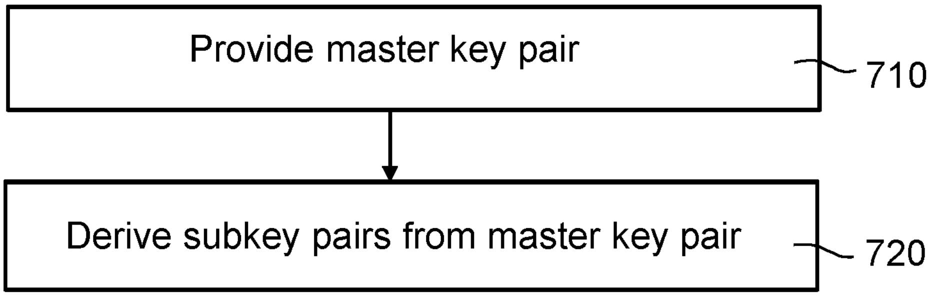
FIG. 7 shows a schematic flow chart of a computer-implemented method according to an embodiment of the invention.

FIG. 7 shows another flow chart of methods steps of a computer-implemented method for performing a digital signature according to a public key signature scheme.

At a step 710, a master key pair is provided comprising a master public key D and a master secret key d.

At a step 720, one or more subkey pairs are derived from the master key pair. The subkey pairs comprise a public subkey D' and a secret subkey d'. The subkey pairs are derived from the master key pair by applying an additive shift operation on the master key pair.

According to embodiments, such an additive key derivation may derive a secret subkey from the master key pair (d,D) by using a discriminant $e \in \mathbb{Z}_q$. The discriminant e may also be denoted as "tweak".

More specifically, the secret subkey may be computed by $d' := d + e$ and the public subkey may be computed by $D' := D + eG$.

As with the mixed key derivation as described above, additive key derivation is also useful in reducing that costs for the secure storage of keys since it allows several distinct public keys to be used while only having to store a single secret key.

Figure 5:
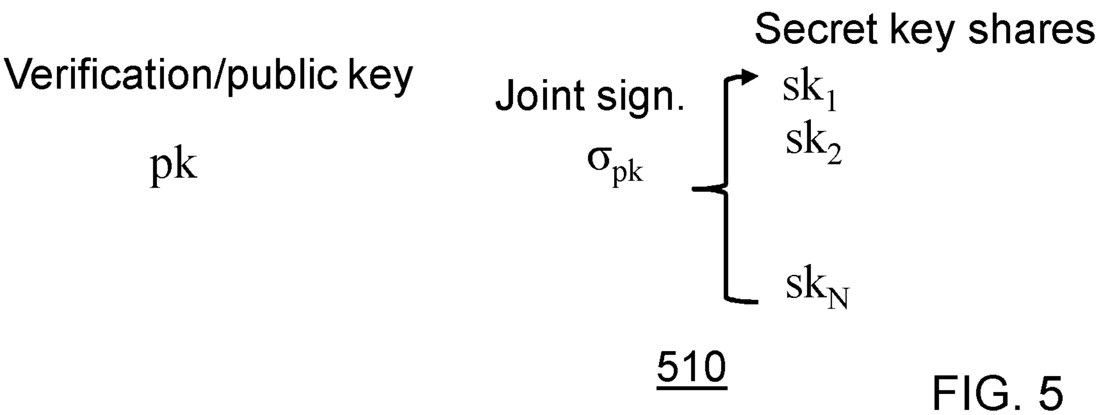
FIG. 5 shows an embodiment of keys which may be generated by a distributed threshold key generation protocol.

FIG. 5 shows an embodiment of keys 510 which may be generated by a distributed threshold key generation protocol. The keys 510 may be used by the system computational units of the replicated system computing cluster to sign messages on request of a user or an application computational unit. It is assumed for this example that a number N of system computational units participate in the distributed key generation protocol. Each of the N system computational units have a secret key share ski, wherein i=1, . . . , N. The N system computational units have generated jointly a common public verification key pk, wherein a predefined threshold, e.g. at least two thirds or a third of the system computational units need to use their secret key shares to create a joint signature σpk. The public verification key pk can then be used to verify the joint signature.

As mentioned above, techniques according to embodiments of the invention which compute presignatures and re-randomize the presignatures may be advantageously used with such a threshold signature.

Figure 6:
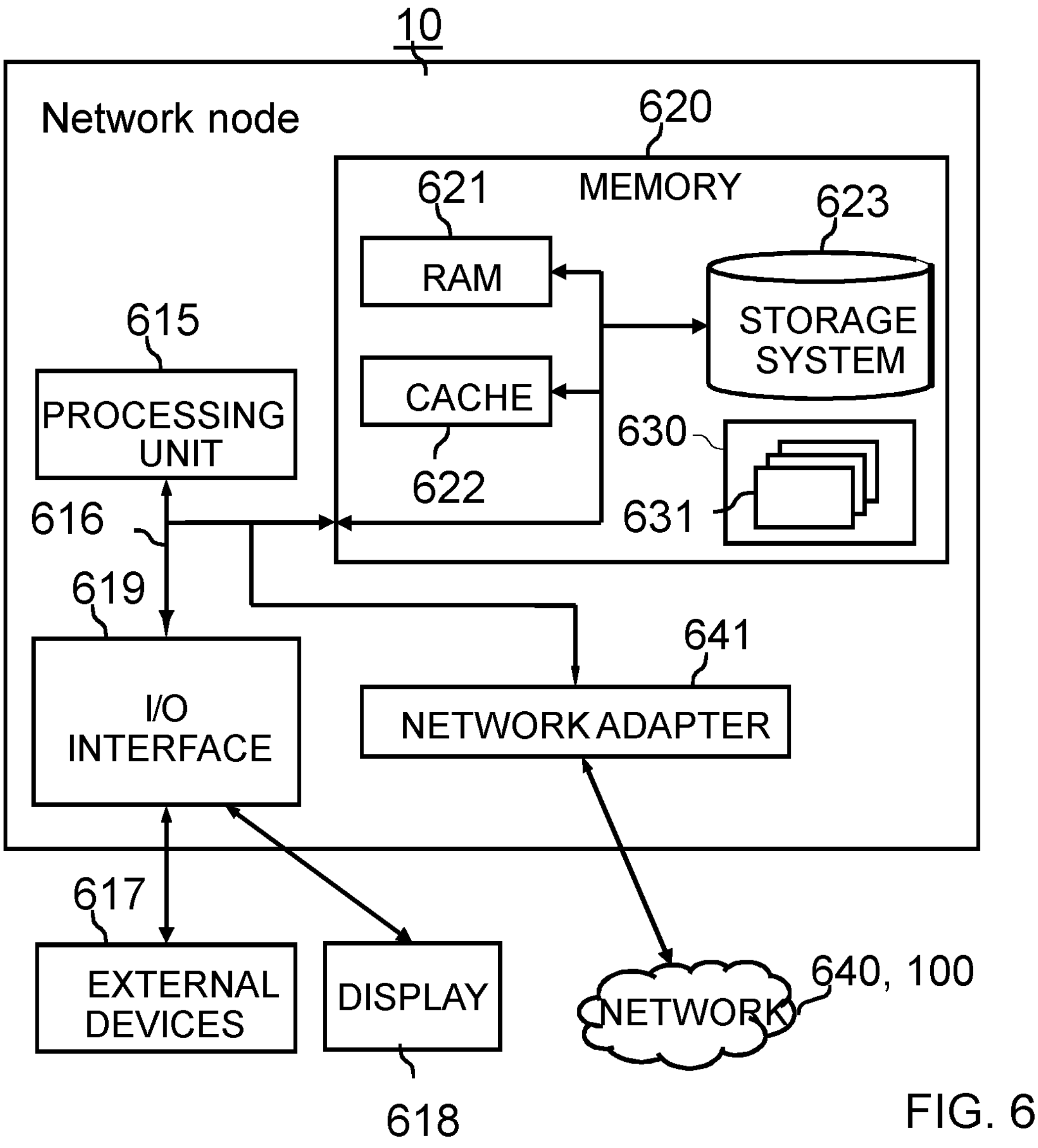
FIG. 6 shows an exemplary embodiment of a node according to an embodiment of the invention.

Referring now to FIG. 6, a more detailed block diagram of a network node 10 according to embodiments of the invention is shown, e.g. of the network 100 of FIG. 1. The network node 10 establishes a computing node that may perform computing functions and may hence be generally embodied as a computing system or computer. The network node 10 may be e.g. a server computer. The network node 10 may be configured to perform a computer-implemented method for operating a distributed network. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 615, a system memory 620, and a bus 616 that couples various system components including system memory 620 to processor 615.

Bus 616 represents one or more of any of several types of bus structures, including a memory bus or memory controller, a peripheral bus, an accelerated graphics port, and a processor or local bus using any of a variety of bus architectures.

Network node 10 typically includes a variety of computer system readable media.

System memory 620 can include computer system readable media in the form of volatile memory, such as random access memory (RAM) 621 and/or cache memory 622. Network node 610 may further include other removable/non-removable, volatile/non-volatile computer system storage media. By way of example only, storage system 623 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 616 by one or more data media interfaces. As will be further depicted and described below, memory 620 may include at least one computer program product having a set (e.g., at least one) of program modules that are configured to carry out the functions of embodiments of the invention.

Program/utility 630, having a set (at least one) of program modules 631, may be stored in memory 620 by way of example, and not limitation, as well as an operating system, one or more application programs, other program modules, and program data. Each of the operating system, one or more application programs, other program modules, and program data or some combination thereof, may include an implementation of a networking environment. Program modules 631 generally carry out the functions and/or methodologies of embodiments of the invention as described herein. Program modules 631 may carry out in particular one or more steps of a computer-implemented method for operating a distributed network e.g. of one or more steps of the methods as described above.

Network node 10 may also communicate with one or more external devices 617 such as a keyboard or a pointing device well as a display 618. Such communication can occur via Input/Output (I/O) interfaces 619. Still yet, network node 10 can communicate with one or more networks 40 such as a local area network (LAN), a general wide area network (WAN), and/or a public network (e.g., the Internet) via network adapter 641. According to embodiments the network 640 may be in particular a distributed network comprising a plurality of network nodes 10, e.g. the network 100 as shown in FIG. 1. As depicted, network adapter 641 communicates with the other components of network node 10 via bus 616. It should be understood that although not shown, other hardware and/or software components could be used in conjunction with network node 10.

Aspects of the present invention may be embodied as a system, in particular a distributed network comprising a plurality of subnetwork, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, optical an storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While above and in the following Annex there are shown and described presently preferred embodiments of the invention, it is to be distinctly understood that the invention is not limited thereto but may be otherwise variously embodied and practiced within the scope of the following claims.

In the following further embodiments and a detailed security analysis of an ECDSA signature algorithm are provided. The applicant has unexpectedly discovered that the concrete security of an ECDSA signature scheme with presignatures is substantially worse than plain ECDSA and the applicant has discovered a possible attack on ECDSA with presignatures as follows:

1. Make one presignature query to get the group element $\mathcal{R}$ and let $t:=\overline{C}(\mathcal{R})$.
2. Compute $\mathcal{R}^* \leftarrow c\mathcal{R}$ for some $c \in \mathbb{Z}_q^*$ and let $t^*:=\overline{C}(\mathcal{R}^*)$.
3. Find m, m* such that h/t=h*/t*, where h:=Hash(m) and h*:=Hash(m*) and m≠m*.
4. Ask for a signature (s,t) using this presignature on message m.
5. Compute s* satisfying $(s^*)^{-1}t^*=cs^{-1}t$, and output (s*, t*).

Observe that (s,t) being a valid signature on m means that $$\mathcal{R} = s^{-1}h\mathcal{G} + s^{-1}t\mathcal{D}.\ \text{Moreover,}$$

$$
\begin{aligned}
\mathcal{R}^* = cR &= cs^{-1}h\mathcal{G} + cs^{-1}t\mathcal{D} \\
&= cs^{-1}t(h/t)\mathcal{G} + cs^{-1}t\mathcal{D} \\
&= (s^*)^{-1}t^*(h/t)\mathcal{G} + (s^*)^{-1}t^*\mathcal{D} \\
&= (s^*)^{-1}t^*(h^*/t^*)\mathcal{G} + (s^*)^{-1}t^*\mathcal{D} \\
&= (s^*)^{-1}h^*\mathcal{G} + (s^*)^{-1}t^*\mathcal{D},
\end{aligned}
$$

which means that (s*, t*) is a valid signature on m*.

To implement Step 3, for fixed t and t*, there is no obvious way to find h,h* satisfying h/t=h*/t* in time faster than $O(q^{1/2})$. However, the inability to do so requires an assumption on Hash that is not needed for plain ECDSA. Moreover, it is clear that ECDSA with presignatures may be insecure if we allow a "raw" signing oracle, i.e., a signing oracle that takes as input the hash m rather than the message m. There are settings where allowing such "raw" signing queries may useful (e.g., in a remote signing service), and plain ECDSA is secure in the EC-GGM even with raw signing queries.

Note that one could extend the above attack to that the attack iterates Steps 3 and 4 for many values of c. This would give us an attack that is essentially a multiplicative variant of a 3-sum problem, for which there is no known algorithm that runs in time $O(q^{1-\epsilon})$ for any $\epsilon > 0$. However, this is again an attack vector that is not available for plain ECDSA.

Table 1 provides a summary of concrete security theorems. In this table "no derivation" indicates that no key derivation technique has been used. "Additive" indicates that an additive key derivation technique has been used and "homogenous" refers to the new key derivation technique according to embodiments of the invention comprising providing a master secret key pair and a master public key pair and deriving a secret subkey from the master secret key pair and a public subkey from the master public key pair. Furthermore, "no presigs" refers to methods without presignatures, "presigs" refers to methods with presignatures and "re-randomized presigs" refers to embodiments with re-randomized presignatures.

| | no presigs | presigs | re-randomized presigs |
|---|---|---|---|
| no derivation | $\varepsilon_{cr} + N\varepsilon_{rpr} + \varepsilon_{zpr} + N^2/q$ | $\varepsilon_{cr} + N\varepsilon_{rpr} + U\,N\varepsilon_{rr} + \varepsilon_{zpr} + N^2/q$ ⊛ | $\varepsilon_{cr} + N\varepsilon_{rpr} + \varepsilon_{zpr} + N^2/q$ |
| additive | $\varepsilon_{cr} + N|\mathfrak{e}|\varepsilon_{rpr} + \varepsilon_{zpr} + N^2/q$ | $\varepsilon_{cr} + N|\mathfrak{e}|\varepsilon_{rpr} + N_{psig}\varepsilon_{4sum1} + N_{psig}N\varepsilon_{4sum2} + \varepsilon_{zpr} + N^2/q$ ⊛ | $\varepsilon_{cr} + N|\mathfrak{e}|\varepsilon_{rpr} + \varepsilon_{zpr}\,N^2/q$ |
| homogenous | $\varepsilon_{cr} + N\varepsilon_{rpr} + \varepsilon_{zpr} + N^2/q$ | $\varepsilon_{cr} + N\varepsilon_{rpr} + U\,N\varepsilon_{rr} + \varepsilon_{zpr} + N^2/q$ ⊛ | $\varepsilon_{cr} + N\varepsilon_{rpr} + \varepsilon_{zpr} + N^2/q$ |

Each table entry gives an upper bound on an adversary's success in producing a forgery (ignoring small constants). The analysis is done on the generic group model, under concrete assumptions for the hash function Hash. The upper bounds are stated in terms of:

- q: the order of the group E;
- N: the number of oracle queries (group, signing, or presignature);
- $N_{psig}$: the number of presignature requests;
- U: the maximum number of unused presignature requests outstanding at any point in time;
- $|\mathfrak{E}|$: the size of the set of valid tweaks;
- $\varepsilon_{cr}$: the probability of successfully finding a collision in Hash;
- $\varepsilon_{rpr}$: the probability of successfully finding a preimage under Hash of a random element in $\mathbb{Z}_q$;
- $\varepsilon_{zpr}$: the probability of successfully finding a preimage under Hash of 0;
- $\varepsilon_{rr}$: the probability, given random $\rho \in \mathbb{Z}_q^*$, of finding m, m* such that h/h*=ρ, where h:=Hash(m) and h*:=Hash (m*) and h*≠0;
- $\varepsilon_{4sum1}$: the probability, given random $t \in \mathbb{Z}_q$, of successfully finding m, e, m*, e* such that h+te=h*+te*, where e, $e^* \in \mathfrak{E}$, e≠e* and h:=Hash(m) and h*:=Hash(m*);
- $\varepsilon_{4sum2}$: the probability, given random t, $t^* \in \mathbb{Z}_q^*$, of successfully finding m, e, m*, e* such that h/t+e=h*/t*+e*, where e, $e^* \in \mathfrak{E}$, (m,e)≠(m*, e*) and h:=Hash(m) and h*:=Hash(m*).

The success probabilities $\varepsilon_{cr}$, $\varepsilon_{rpr}$, $\varepsilon_{zpr}$, $\varepsilon_{rr}$, $\varepsilon_{4sum1}$, $\varepsilon_{4sum2}$ are stated in terms of an adversary whose running time is essentially that of the forging adversary (or that time plus UN, in the either of the presignature settings). Also, the symbol in the table indicates that this mode of operation may be less secure with "raw" signing.

For additive key derivation, it is assumed that the set of all valid tweaks is not too large and is determined in advance. In practice (such as with BIP32), tweaks are derived, via a hash, from identifiers (possibly combined with a "root" public key). This assumption on the set of tweaks can be justified if the set of valid identifiers, and in particular, the set of identifiers with respect to which we are concerned about forgeries, is indeed small. It can also be further justified by modelling the hash function used to derive tweaks as a random oracle. That said, the analysis also works without this assumption.

The invention claimed is:

1. A computer-implemented method for performing a digital signature according to a public key signature scheme, the method comprising:

computing a presignature;

receiving a signing request to perform the digital signature on a message;

re-randomizing the presignature comprising computing a non-predictable public re-randomization value; and utilizing the non-predictable public re-randomization value for the re-randomizing of the presignature, wherein the non-predictable public re-randomization value is generated after receiving the signing request; and performing the digital signature on the message with the re-randomized presignature.

2. The computer-implemented method according claim 1, wherein computing the presignature comprises computing a random nonce; and re-randomizing the presignature comprises re-randomizing the nonce.

3. The computer-implemented method according to claim 1, wherein re-randomizing the presignature comprises performing an algebraic operation on the presignature.

4. The computer-implemented method according to claim 1, wherein re-randomizing the presignature comprises performing a linear operation on the presignature.

5. The computer-implemented method according to claim 1, wherein the digital signature is a threshold signature.

6. The computer-implemented method according to claim 1, further comprising performing a pseudo-random generation of the non-predictable public re-randomization value.

7. The computer-implemented method according to claim 1, wherein computing the non-predictable public re-randomization value comprises deriving the non-predictable public re-randomization value by applying a hash function to at least the message or a hash of the message, or applying the hash function to the public key of the digital signature and/or to other inputs.

8. The computer-implemented method according to claim 1, wherein computing the non-predictable public re-randomization value comprises deriving the non-predictable public re-randomization value from a random beacon.

9. The computer-implemented method according to claim 1, wherein the digital signature is a digital signature according to a signature algorithm based on discrete logarithms.

10. The computer-implemented method according to claim 1, wherein the digital signature is a digital signature according to a signature algorithm based on elliptic curves, the digital signature algorithm comprising Elliptic Curve Digital Signature Algorithm (ECDSA).

11. The computer-implemented method according to claim 10, wherein the digital signature algorithm operates on an elliptic curve E generated by a point G of order q, in particular prime order q, and wherein computing the presignature comprises generating a random element r' by:

$$r' \to Z_q^*;$$

and computing $$R' \leftarrow r'G \in E;$$

wherein re-randomizing the presignature comprises computing $$r := r' + \delta;\ R := R' + \delta G;$$

wherein δ is the non-predictable public value.

12. The computer-implemented method according to claim 1, the method further comprising:

providing a master secret key pair, the master secret key pair comprising a first master secret key and a second master secret key;

providing a master public key pair, the master public key pair comprising a first master public key and a second master public key';

deriving a secret subkey from the master secret key pair; and deriving a public subkey from the master public key pair.

13. The computer-implemented method according to claim 12, wherein deriving the secret subkey from the master secret key pair comprises performing a first algebraic operation on the master secret key pair; and deriving the public subkey from the master public key pair comprises performing a second algebraic operation on the master public key pair, wherein the first algebraic operation and the second algebraic operation are linear operations.

14. The computer-implemented method according to claim 12, wherein deriving the secret subkey from the master secret key pair comprises performing a mixed key derivation such that the secret subkey depends on both the first master secret key and the second master secret key and the public subkey depends on both the first master public key and the second master public key.

15. The computer-implemented method according to claim 12, wherein the digital signature algorithm operates on an elliptic curve E defined over $Z_p$ and generated by a point G of order q, in particular prime order q, wherein $$(D, D'):=(dG, d'G);$$

and wherein

D is the first master public key;

D' is the second master public key d is the first master secret key;

d' is the second master secret key;

the method further comprising:

providing a discriminant e, wherein the discriminant $e \in Z_q$;

deriving the secret subkey from the master secret key pair by computing d":=d+ed'; and deriving the public subkey D" from the master public key pair by computing D":=D+eD', wherein D is the first master public key;

D' is the second master public key;

d is the first master secret key;

d' is the second master secret key;

d" is the secret subkey; and

D" is the public subkey;

wherein the method further comprises deriving the discriminant e by a hash function, wherein the hash function is applied on a set of hash input data, the hash input data comprising an arbitrary identifier, the master public key pair and/or further input data, wherein the arbitrary identifier uniquely identifies ownership and/or context of the public subkey or the secret subkey.

16. The computer-implemented method according to claim 1, further comprising:

providing a master key pair comprising a master public key and a master secret key;

deriving subkey pairs comprising a public subkey and a secret subkey from the master key pair by applying an additive shift operation on the master key pair.

17. The computer-implemented method according to claim 16, comprising:

providing a discriminant e, in particular a discrimant $e \in Z_q$;

computing the secret subkey by d':=d+e; and computing the public subkey by $$D' := D + eG.$$

18. A computing system for performing a digital signature according to a public key signature scheme, the computing system comprising a processor and a memory, wherein the computing system is configured to compute a presignature;

receive a signing request to perform the digital signature on a message;

re randomize the presignature, wherein to re-randomize the presignature, the computing system is to compute a non-predictable public re-randomization value; and utilize the non-predictable public re-randomization value for the re-randomizing of the presignature, wherein the non-predictable public re-randomization value is generated after receiving the signing request; and perform the digital signature on the message with the re-randomized presignature.

19. A computer program product for performing a digital signature according to a public key signature scheme, the computer program product comprising a non-transitory computer readable storage medium having program instructions embodied therewith, the program instructions executable by a computing system to cause the computing system to perform a method comprising:

computing a presignature;

receiving a signing request to perform the digital signature on a message;

re-randomizing the presignature comprising computing a non-predictable public re-randomization value; and utilizing the non-predictable public re-randomization value for the re-randomizing of the presignature, wherein the non-predictable public re-randomization value is generated after receiving the signing request; and performing the digital signature on the message with the re-randomized presignature.

* * * * *